US008608256B2

(12) United States Patent
Park

(10) Patent No.: US 8,608,256 B2
(45) Date of Patent: Dec. 17, 2013

(54) HYDRAULIC CONTROL METHOD OF REGENERATIVE BRAKING SYSTEM FOR VEHICLE

(75) Inventor: Man Bok Park, Seoul (KR)

(73) Assignee: Mando Corporation, Gyeonggi-Do (KR)

( * ) Notice: Subject to any disclaimer, the term of this patent is extended or adjusted under 35 U.S.C. 154(b) by 457 days.

(21) Appl. No.: 12/872,483

(22) Filed: Aug. 31, 2010

(65) Prior Publication Data

US 2011/0049969 A1   Mar. 3, 2011

(30) Foreign Application Priority Data

Sep. 1, 2009   (KR) .................. 10-2009-0081798

(51) Int. Cl.
*B60T 8/64*   (2006.01)
*B60T 8/32*   (2006.01)
(52) U.S. Cl.
USPC .................................. 303/152; 303/3; 303/15
(58) Field of Classification Search
USPC ............ 303/3, 13, 15, 20, 152, 191; 318/362, 318/371, 372, 375
See application file for complete search history.

(56) References Cited

U.S. PATENT DOCUMENTS

| | | | | |
|---|---|---|---|---|
| 5,632,534 A | * | 5/1997 | Knechtges | 303/152 |
| 6,086,166 A | * | 7/2000 | Fukasawa | 303/152 |
| 6,663,197 B2 | * | 12/2003 | Joyce | 303/152 |
| 2007/0126382 A1 | * | 6/2007 | Kang et al. | 318/376 |
| 2007/0228822 A1 | * | 10/2007 | Hirata | 303/151 |

FOREIGN PATENT DOCUMENTS

| | | | |
|---|---|---|---|
| JP | 2000-197205 | | 7/2000 |
| JP | 2007062448 A | * | 3/2007 |
| JP | 2007-153146 | | 6/2007 |

OTHER PUBLICATIONS

English Machine Translation of JP'448.*
Chinese Office Action, w/ English translation thereof, issued in Chinese Patent Application No. CN 201010266558.6 dated May 15, 2013.

* cited by examiner

*Primary Examiner* — Melody Burch
(74) *Attorney, Agent, or Firm* — McDermott Will & Emery LLP

(57) ABSTRACT

A hydraulic control method of a regenerative braking system for vehicles in which a point of time when regenerative braking torque starts to be reduced is predicted and hydraulic control is performed in advance prior to this point of time so as to improve braking performance. A hydraulic braking control unit predicts the point of time when regenerative braking torque starts to be reduced based on vehicle velocity and starts hydraulic control in advance prior to this point of time, thereby improving responsiveness of hydraulic braking force compared to the regenerative braking torque to satisfy braking force required by a driver, and minimizing a deceleration change at the end of regenerative braking to improve braking performance.

7 Claims, 6 Drawing Sheets

HYDRAULIC CONTROL METHOD OF REGENERATIVE BRAKING SYSTEM FOR VEHICLE

CROSS-REFERENCE TO RELATED APPLICATION

This application claims the benefit of Korean Patent Application No. 2009-0081798, filed on Sep. 1, 2009 in the Korean Intellectual Property Office, the disclosure of which is incorporated herein by reference.

BACKGROUND

1. Field

Embodiments of the present invention relate to a hydraulic control method of a regenerative braking system for vehicles in which a point of time when regenerative braking torque starts to be reduced is predicted and hydraulic control is performed in advance prior to this point of time so as to improve braking performance.

2. Description of the Related Art

A hybrid fuel cell vehicle is a hybrid electric vehicle having two or more kinds of braking force using an existing engine and an electric motor (driving motor) as power sources, and selectively uses power of the engine and power of the electric motor according to load and velocity of the vehicle and converts remaining energy into electric energy using the electric motor, thereby achieving high fuel efficiency and low pollution.

Such a hybrid fuel cell vehicle is traveled by rotating driving wheels of the vehicle with the electric motor operated by electric energy. Here, it is a very important subject to efficiently use the electric energy to drive the electric motor. For this purpose, if a deceleration or brake order is given by a driver, the electric motor functions as a generator and electric energy generated from the electric motor is stored in an electric condenser. While the electric motor functions as the generator, braking force is applied to vehicle wheels and such braking force is referred to as regenerative braking force. Consequently, the total braking force applied to the vehicle wheels is the sum of regenerative braking force generated from the electric motor and hydraulic braking force generated from a hydraulic control device.

Therefore, in order to satisfy driver's braking intention, generation of only hydraulic braking force equal to a value, obtained by subtracting regenerative braking force corresponding to an amount of braking force, generated from the electric motor, from braking force required by the driver, is required.

FIG. 1 shows profiles illustrating a braking pattern of a conventional regenerative braking system under the condition that a velocity of a Continuously Variable Transmission (CVT) or planet gear type vehicle is reduced as time goes by.

As shown in FIG. 1, regenerative braking torque (regenerative braking force) is decreased as the velocity of the vehicle increases, and is increased as the velocity of the vehicle decreases and is rapidly decreased at a designated low velocity of the vehicle. Therefore, hydraulic braking force needs to be decreased in a section in which the regenerative braking torque (regenerative braking force) is increased, and hydraulic braking force needs to be increased in a section in which the regenerative braking torque (regenerative braking force) is decreased.

In such a regenerative braking system, a point of time when the generated regenerative braking torque must be removed occurs. Due to slow responsiveness of hydraulic braking force compared to responsiveness of regenerative braking force at this point of time, the total braking force, i.e. the sum of the hydraulic braking force and the regenerative braking force, is not uniform, and thus a deceleration change frequently occurs, as shown in FIG. 1.

SUMMARY

Therefore, it is an aspect of the present invention to provide a hydraulic control method of a regenerative braking system for vehicles in which a point of time when regenerative braking torque starts to be reduced is predicted and hydraulic control is performed prior to this point of time so as to compensate for slow responsiveness of hydraulic braking force compared to responsiveness of regenerative braking force to satisfy braking force required by a driver, and a deceleration change at the end of regenerative braking is minimized so as to improve braking performance.

Additional aspects of the invention will be set forth in part in the description which follows and, in part, will be obvious from the description, or may be learned by practice of the invention.

In accordance with one aspect of the present invention, a hydraulic control method of a regenerative braking system for vehicles includes generating regenerative braking torque through an electric motor, predicting a point of time when the regenerative braking torque starts to be reduced based on vehicle velocity through a hydraulic braking control unit, and starting hydraulic control prior to the predicted point of time when the regenerative braking torque starts to be reduced, so as to improve responsiveness of hydraulic braking force compared to the regenerative braking torque.

The hydraulic braking control unit may generate a hydraulic control start signal prior to the predicted point of time when the regenerative braking torque starts to be reduced.

The hydraulic braking control unit may sense braking force required by a driver through a master pressure or a pedal stroke, and generate the hydraulic braking force, corresponding to a value obtained by subtracting the regenerative braking force from the braking force required by the driver, through the hydraulic control.

The hydraulic braking control unit may start the hydraulic control in advance before the regenerative braking torque starts to be reduced, so as to generate the hydraulic braking force with fast responsiveness to the regenerative braking torque change.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
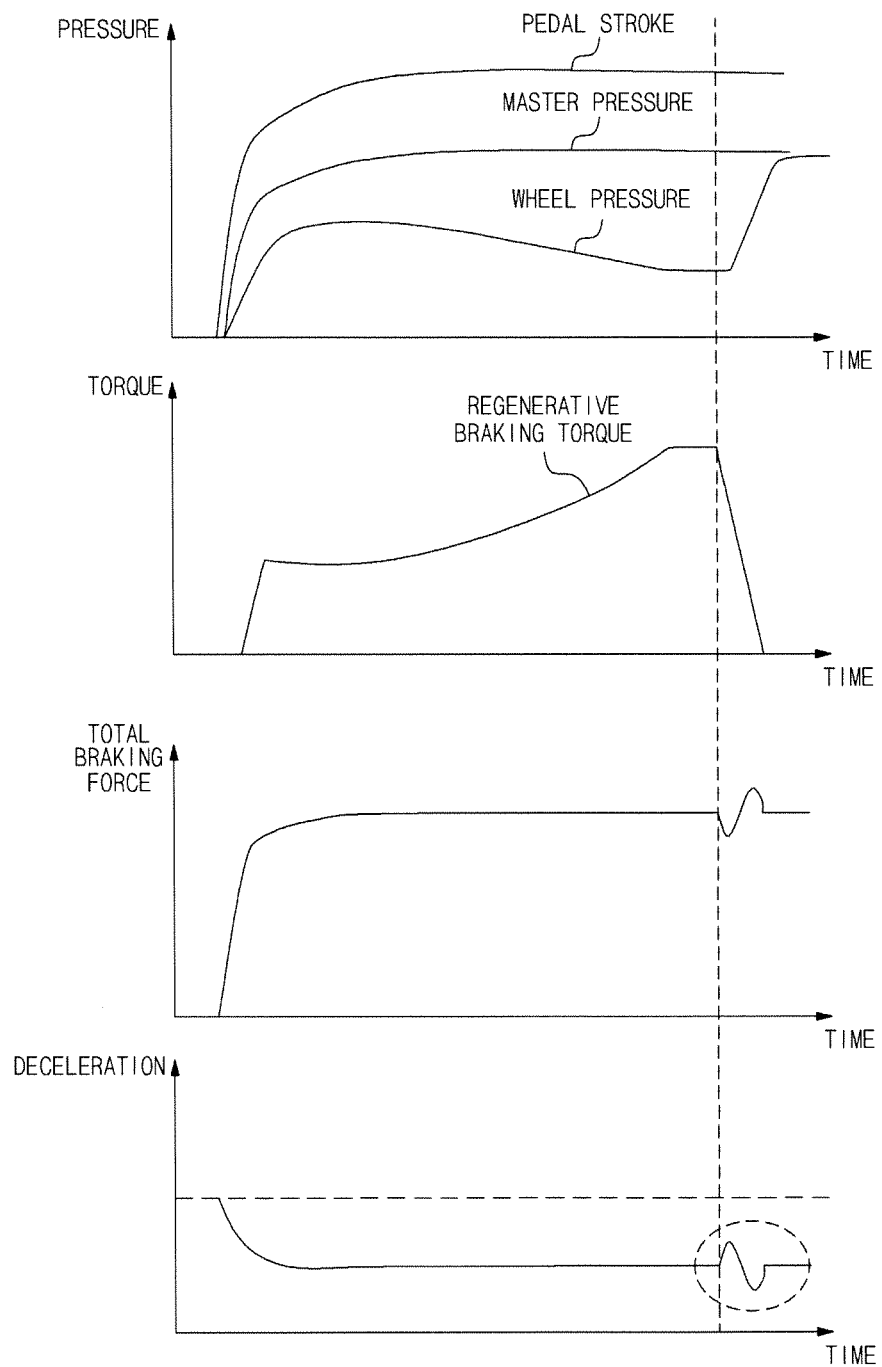
FIG. 1 shows profiles illustrating a braking pattern of a conventional regenerative braking system.

Reference will now be made in detail to the embodiments of the present invention, examples of which are illustrated in the accompanying drawings, wherein like reference numerals refer to like elements throughout.

Figure 2:
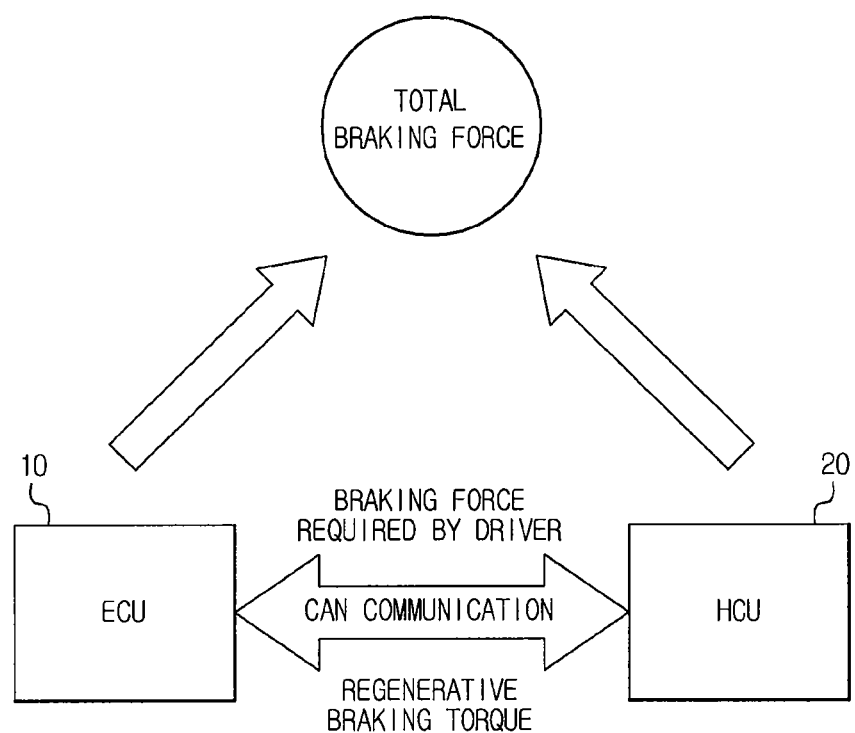
FIG. 2 is a schematic view illustrating a concept of a regenerative braking system in accordance with one embodiment of the present invention.

FIG. 2 is a schematic view illustrating a concept of a regenerative braking system in accordance with one embodiment of the present invention.

As shown in FIG. 2, the regenerative braking system in accordance with the embodiment of the present invention includes a hydraulic brake control unit (ECU) 10 to sense braking force required by a driver through a master pressure or a pedal stroke and to perform hydraulic control to generate hydraulic braking force equal to a value obtained by subtracting regenerative braking force corresponding to regenerative braking torque from the braking force (total braking force) required by a driver, and a hybrid control unit 20 (HCU) to generate the regenerative braking torque corresponding to an amount of force generated by an electric motor rotating wheels FL, RR, RL, and FR of a vehicle using electric energy, performing regenerative braking and to transmit the regenerative braking torque to the hydraulic brake control unit 10.

The hydraulic brake control unit 10 and the hybrid control unit 20 transmit data to each other through CAN communication.

Figure 3:
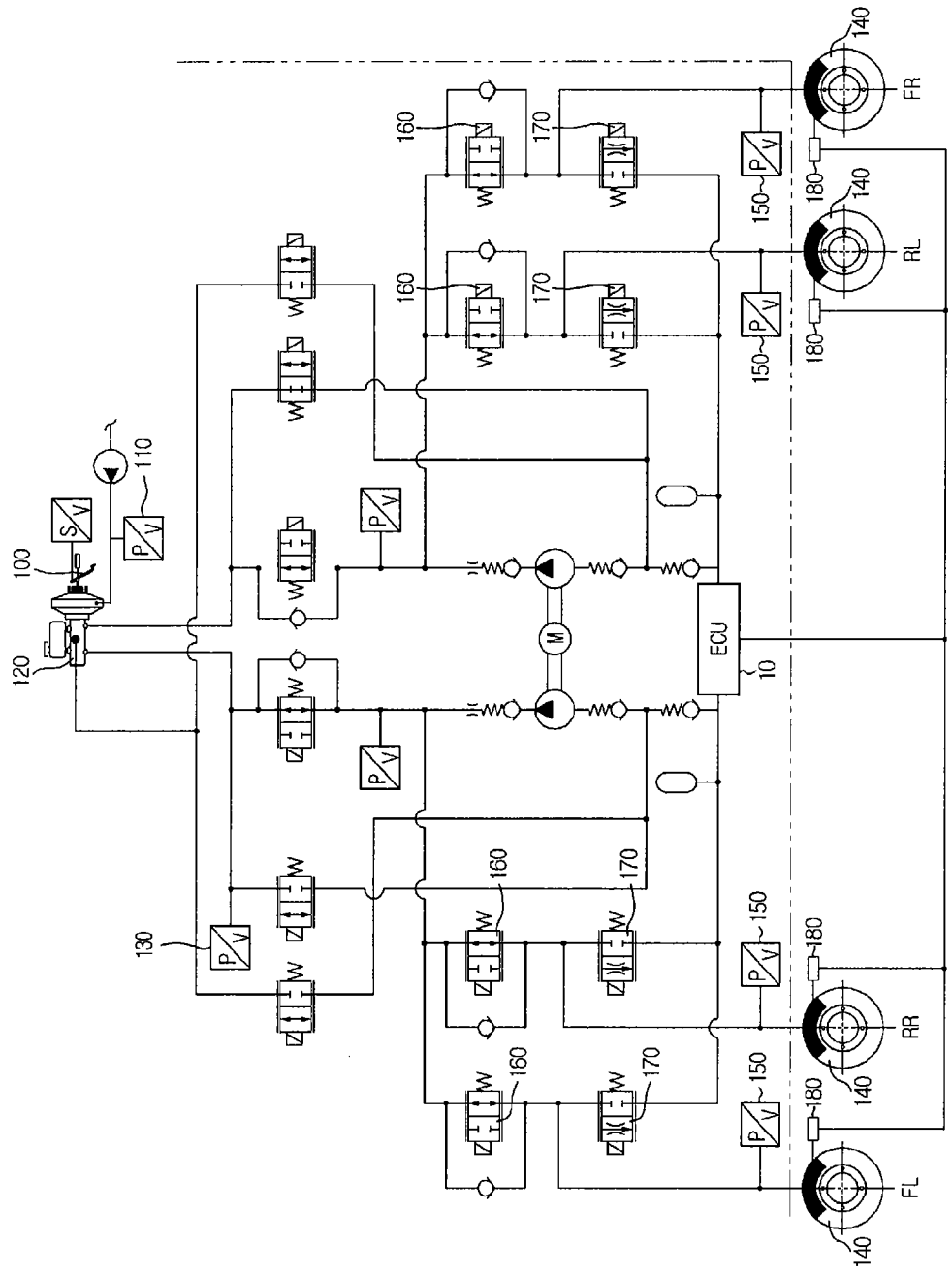
FIG. 3 is a circuit diagram illustrating hydraulic control in the regenerative braking system in accordance with the embodiment of the present invention.

FIG. 3 is a circuit diagram illustrating hydraulic control in the regenerative braking system in accordance with the embodiment of the present invention.

As shown in FIG. 3, a hydraulic control device of the regenerative braking system in accordance with the embodiment of the present invention includes a pedal stroke sensor 110 to sense an operation amount of a brake pedal 110, i.e. an amount of braking force required by a driver, a master cylinder 120 to supply brake hydraulic pressure through the operation of the brake pedal 100 to cause brake operation, a master pressure sensor 130 to sense pressure of the master cylinder 120 changed by driver's braking intention, wheel pressure sensors 150 respectively installed on the wheels FL, RR, RL, and FR to sense braking force substantially applied to wheel cylinders 140, a plurality of inlet valves 160 and outlet valves 170 respectively installed at inlet sides and outlet sides of the wheel cylinders 140 to transmit the braking pressure, wheel velocity sensors 180 respectively installed at the wheels FL, RR, RL, and FR to sense vehicle velocity, and the hydraulic brake control unit 10 to control opening and closing of the plurality of inlet valves 160 and outlet valves 170.

The hydraulic brake control unit 10 receives the regenerative braking force, generated from the electric motor, from the hybrid control unit 20 through the CAN communication, and senses the braking force required by the driver through the pedal stroke sensed by the pedal stroke sensor 110 or the master pressure sensed by the master pressure sensor 130. Thereafter, the hydraulic brake control unit 10 generates hydraulic braking force equal to a value obtained by subtracting the regenerative braking force corresponding to the regenerative braking torque from the braking force (total braking force) required by the driver, and then performs hydraulic control. Here, the hydraulic brake control unit 10 calculates a target wheel pressure based on the hydraulic braking force equal to the value obtained by subtracting the regenerative braking force from the total braking force, and adjusts a pressure of the master cylinder 120 so as to coincide with the target wheel pressure. The target wheel pressure is braking pressure to be applied to all the wheels FL, RR, RL, and FR, and hydraulic braking force transmitted to the wheel cylinders 140 is adjusted.

Further, the hydraulic braking control unit 10 predicts a point of time when the regenerative braking torque starts to be reduced by determining a regenerative braking torque reduction start velocity according to current torque and sensing current vehicle velocity with the wheel velocity sensors 180, and starts hydraulic control in advance prior to the point of time when the regenerative braking force starts to be reduced, thereby compensating for slow responsiveness of the hydraulic braking force compared to the regenerative braking torque and thus satisfying the braking force required by the driver and performing braking without a deceleration change.

Hereinafter, operation and effects of a hydraulic control method of the above regenerative braking system will be described.

Figure 4:
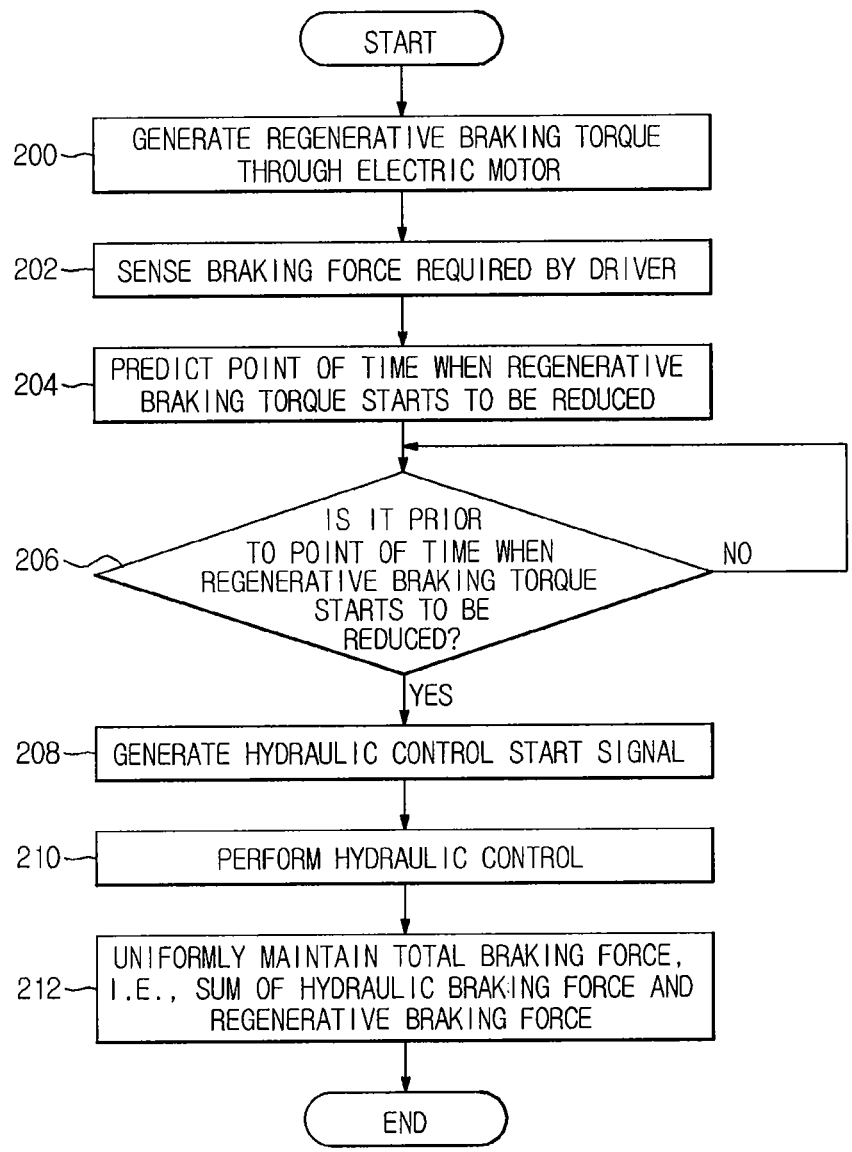
FIG. 4 is a flow chart illustrating a hydraulic control method of the regenerative braking system in accordance with the embodiment of the present invention.
Figure 5:
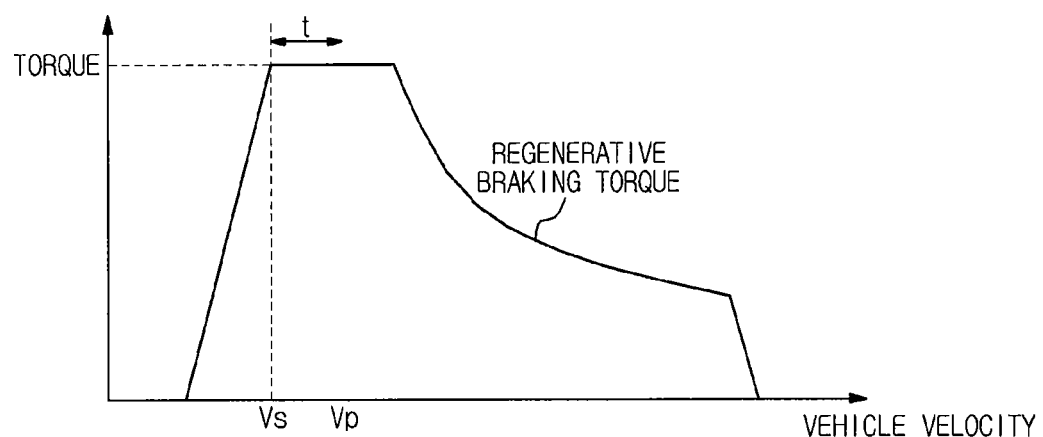
FIG. 5 is a graph illustrating a map of regenerative braking torque versus vehicle velocity in the regenerative braking system in accordance with the embodiment of the present invention.
Figure 6:
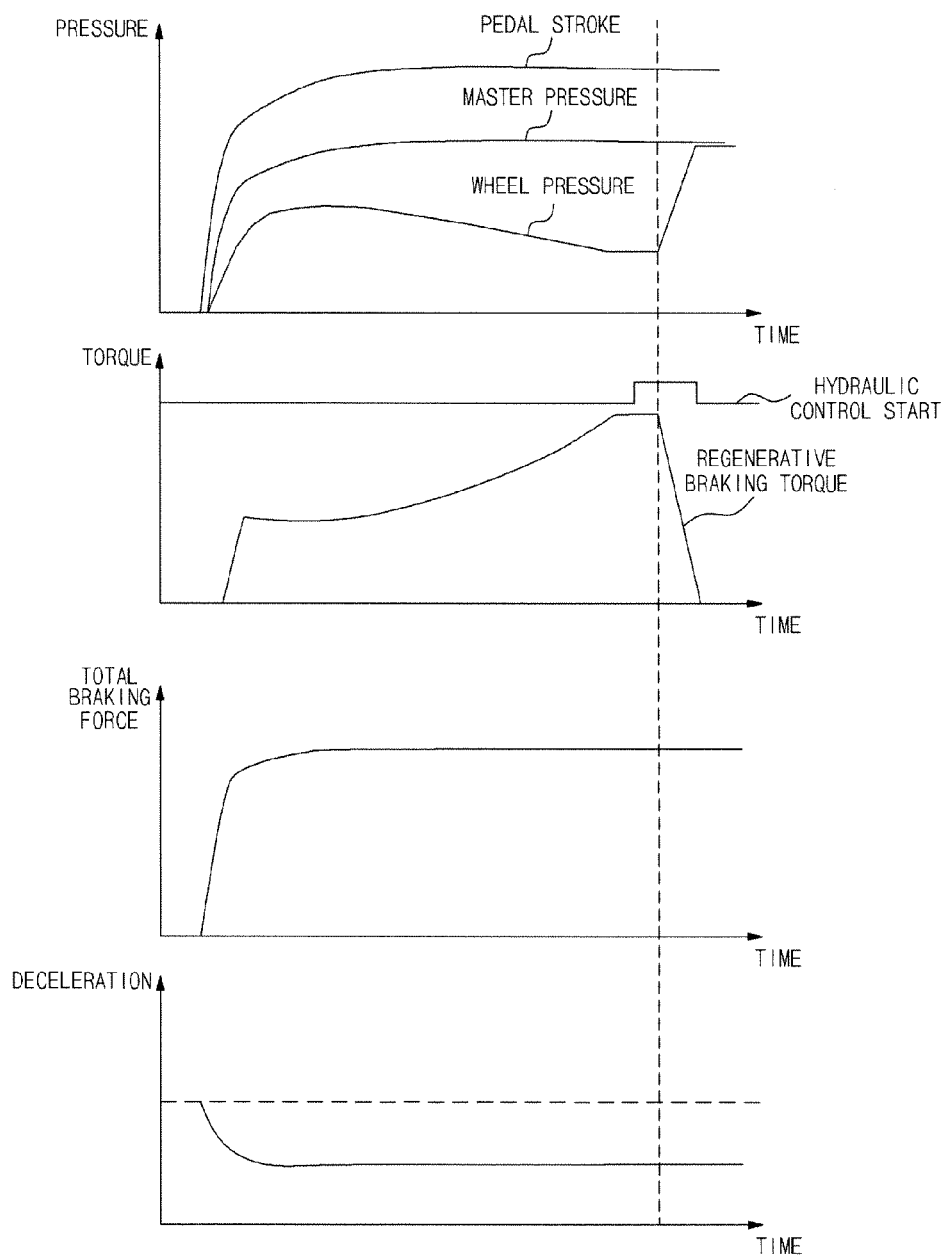
FIG. 6 shows profiles illustrating a braking pattern of the regenerative braking system in accordance with the embodiment of the present invention.

FIG. 4 is a flow chart illustrating the hydraulic control method of the regenerative braking system in accordance with the embodiment of the present invention, FIG. 5 is a graph illustrating a map of regenerative braking torque versus vehicle velocity in the regenerative braking system in accordance with the embodiment of the present invention, and FIG. 6 shows profiles illustrating a braking pattern of the regenerative braking system in accordance with the embodiment of the present invention.

As shown in FIG. 4, when a driver operates the brake pedal 100, regenerative braking torque, which is inversely proportional to vehicle velocity according to change of the regenerative braking torque by the electric motor, is generated, as shown in FIG. 5, and the hybrid control unit 20 brakes the wheels FL, RR, RL, and FR of the vehicle with regenerative braking force corresponding to the regenerative braking torque (operation 200).

Here, the pedal stroke sensor 110 installed at the brake pedal 100 senses a pedal stoke value according to a stroke distance of the brake pedal 100 and transmits the pedal stroke value to the hydraulic braking control unit 10, as shown in FIG. 6, and the master pressure sensor 130 installed at the master cylinder 120 senses a master pressure value based on hydraulic pressure generated from the master cylinder 120 according to the operation of the brake pedal 100 and transmits the master pressure value to the hydraulic braking control unit 10, as shown in FIG. 6.

Therefore, the hydraulic braking control unit 10 senses braking force required by the driver according to the pedal stroke or the master pressure (operation 202), and performs hydraulic control so as to supply hydraulic braking force corresponding to a deficiency of the braking force required by the driver (the master pressure or the pedal stroke).

For this purpose, the hydraulic braking control unit 10 predicts a point of time when the regenerative braking torque starts to be reduced using Equation 1 below by determining a velocity Vs at which the regenerative braking torque starts to be reduced according to current torque and sensing current vehicle velocity Vp through the wheel velocity sensors 180 (operation 204).

$$t=(Vp-Vs)/a \qquad \text{Equation 1}$$

Here, Vp is current vehicle velocity, Vs is regenerative braking torque reduction start velocity determined by the current torque, a is deceleration, and t is predicted remaining time for the point of time when the regenerative braking torque starts to be reduced.

When the predicted remaining time t for the point of time when the regenerative braking torque starts to be reduced is calculated by Equation 1, the hydraulic braking control unit 10 judges whether or not it is prior to the point of time when the regenerative braking torque starts to be reduced (operation 206), because the regenerative braking torque starts to be reduced after the predicted remaining time t. If it is judged that it is prior to the point of time when the regenerative braking torque starts to be reduced, the hydraulic braking control unit 10 generates a signal to start hydraulic control, as shown in FIG. 6 (operation 208).

Then, the hydraulic braking control unit 10 starts hydraulic control in advance according to the hydraulic control start signal (operation 210).

As described above, by compensating for slow responsiveness of the hydraulic braking force compared to the regenerative braking torque by starting hydraulic control in advance prior to the point of time when the regenerative braking torque starts to be reduced, the total braking force, i.e., the sum of the hydraulic braking force and the regenerative braking force, is uniformly maintained, as shown in FIG. 6, thereby obtaining stable braking performance without a deceleration change at the end of regenerative braking (operation 212).

As is apparent from the above description, in a hydraulic control method of a regenerative braking system for vehicles in accordance with one embodiment of the present invention, a hydraulic braking control unit predicts a point of time when regenerative braking torque starts to be reduced based on vehicle velocity and starts hydraulic control in advance prior to this point of time, thereby improving responsiveness of hydraulic braking force compared to the regenerative braking torque to satisfy braking force required by a driver, and minimizing a deceleration change at the end of regenerative braking to improve braking performance.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A hydraulic control method of a regenerative braking system for vehicles comprising:
    generating regenerative braking torque through an electric motor;
    predicting a point of time when the regenerative braking torque starts to be reduced based on vehicle velocity through a hydraulic braking control unit; and
    after predicting the point of time, starting hydraulic control prior to the predicted point of time when the regenerative braking torque starts to be reduced, so as to improve responsiveness of hydraulic braking force compared to the regenerative braking torque.

2. The hydraulic control method according to claim 1, wherein the hydraulic braking control unit generates a hydraulic control start signal prior to the predicted point of time when the regenerative braking torque starts to be reduced.

3. The hydraulic control method according to claim 1, wherein the hydraulic braking control unit senses braking force required by a driver through a master pressure or a pedal stroke, and generates the hydraulic braking force, corresponding to a value obtained by subtracting the regenerative braking force from the braking force required by the driver, through the hydraulic control.

4. The hydraulic control method according to claim 3, wherein the hydraulic braking control unit starts the hydraulic control in advance before the regenerative braking torque starts to be reduced, so as to generate the hydraulic braking force with fast responsiveness to the regenerative braking torque change.

5. The hydraulic control method according to claim 1, wherein predicting the point of time includes determining a velocity at which the regenerative braking torque starts to be reduced.

6. The hydraulic control method according to claim 5, wherein determining the velocity is performed according to current torque and current vehicle velocity.

7. The hydraulic control method according to claim 1, wherein predicting the point of time includes using the equation: $t=(V_p-V_s)/a$; where $V_p$ is current vehicle velocity, $V_s$ is regenerative braking torque reduction start velocity determined by the current torque, a is deceleration, and t is predicted remaining time for the point of time when the regenerative braking torque starts to be reduced.

* * * * *